US012327923B2

(12) United States Patent
Shen et al.

(10) Patent No.: US 12,327,923 B2
(45) Date of Patent: Jun. 10, 2025

(54) MIXED ELEMENT BEAM FORMING ANTENNA

(71) Applicant: Communication Components Antenna Inc., Kanata (CA)

(72) Inventors: Lin-Ping Shen, Ontario (CA); Nasrin Hojjat, Ottawa (CA); Hua Wang, Ontario (CA); Erik Willis, Ontario (CA); Liviu Negru, Quebec (CA)

(73) Assignee: Communication Components Antenna Inc., Kanata (CA)

(*) Notice: Subject to any disclaimer, the term of this patent is extended or adjusted under 35 U.S.C. 154(b) by 299 days.

(21) Appl. No.: 17/832,324

(22) Filed: Jun. 3, 2022

(65) Prior Publication Data

US 2023/0395974 A1 Dec. 7, 2023

(51) Int. Cl.
*H01Q 1/24* (2006.01)
*H01Q 3/32* (2006.01)

(52) U.S. Cl.
CPC ............... *H01Q 3/32* (2013.01); *H01Q 1/246* (2013.01)

(58) Field of Classification Search
CPC .......... H01Q 3/32; H01Q 1/246; H01Q 21/24; H01Q 21/26
See application file for complete search history.

(56) References Cited

U.S. PATENT DOCUMENTS

| | | | | |
|---|---|---|---|---|
| 7,053,832 | B2 * | 5/2006 | Manzione | H01Q 21/26 343/727 |
| 11,245,199 | B2 * | 2/2022 | Liu | H01Q 5/392 |
| 2013/0300602 | A1 * | 11/2013 | Zhou | H01Q 21/065 342/372 |
| 2018/0301801 | A1 * | 10/2018 | Hojjat | H01Q 9/16 |
| 2019/0268052 | A1 * | 8/2019 | Ho | H04B 7/0617 |
| 2023/0291121 | A1 * | 9/2023 | Mondi | H01Q 3/267 |

OTHER PUBLICATIONS

Miniaturized VHF/UHF Dual-Band Circularly Polarized Four-Element Sequential-Rotation Array Antenna Based on Alternately Overlapped Bent Radiation-Coupled Dual-L Antenna Elements Shaowei Liao and Quan Xue.

* cited by examiner

*Primary Examiner* — Daniel Munoz
(74) *Attorney, Agent, or Firm* — Sofer & Haroun, LLP

(57) ABSTRACT

A beamforming cellular antenna includes a plurality of patch elements and a plurality of dipole elements. The plurality of patch elements and dipole elements are arranged on a planar array of said antenna into a plurality of rows and columns of elements. Each column of elements forms a sub-array connected to a plurality of signal input ports. Each column sub-array includes a plurality of both patch elements, and a plurality of dipole elements.

13 Claims, 10 Drawing Sheets

MIXED ELEMENT BEAM FORMING ANTENNA

FIELD OF THE INVENTION

This invention relates to cellular antennas. More particularly, the present arrangement relates to a cellular antenna that employs mixed element types for beam forming.

DESCRIPTION OF RELATED ART

In the field of cellular communications and infrastructure, beam forming antennas are planar array antennas that can control the transmitting/receiving radio signals in a specific direction. Unlike broadcasting radio signals in all directions as traditional base station antennas, beam forming antennas use a beamforming technology to determine the desired direction of interest dynamically and send/receive a stronger beam of radio signals in this defined direction. This technique is widely used in radars and wireless communications, particularly in 5G networks. For example, in 5G networks, due to very high data rates, the beamforming technique is the only approach to support and maintain high data rate transmissions in an efficient way. Overall, beamforming antennas are unique in their ability to reduce interference, improve the Signal-to-Interference-and-Noise Ratio (SINR), and deliver a better end user experience in 5G and future networks.

A basic prior art beam forming planar antenna typically includes several antenna column subarrays, each column subarray having of a number of antenna elements, and all ports of antenna column subarrays being coupled to a calibration port of the antenna for receiving a calibration signal that can calibrate the amplitude and phase errors caused by other devices in radio frequency (RF) path. In other words, the amplitude and phase errors caused by other RF devices such as input jumper cables and connectors can be adjusted through the calibration signals sent through the calibration port. For achieving a better scan angle and a higher gain of the antenna, the column spacing should be at a half-wavelength of the center frequency point of the operation band.

A beam forming antenna is made from the same type of antenna elements, such as dipole or patch elements. For example, for an eight-port, four-column, twelve-row dipole-based beam forming antenna (see prior art FIG. 1), the closely spaced forty-eight dipole elements 14 are installed uniformly on reflector 12 of antenna 10 in rows #1-#12 and in columns #1-#4. A subarray, such as subarray 17, refers to all of the elements in a particular column. In this prior art example, which is a dual polarized application, there are two ports 18 for each column subarray 17, for a total of eight ports 18 for antenna 10 (only four are visible in FIG. 1, because they are side-by side at the bottom of the antenna—there is also an extra calibration port 19). As explained previously, patch and dipole elements are two basic components for base station antennas including beam forming antennas selected based on desired basic physical parameters and radiation patterns that meet the desired design parameters for specific antenna implementations.

Theoretically, for dipole-based antennas, the Cross Polar Isolation (XPI) within columns and Co-Polar Isolation (CPI) between columns meet the required industry standard specifications. Here XPI is the isolation between two different polarizations (i.e., +45 port and −45 port) for each column subarray 17 and CPI is the isolation between two same polarizations (i.e., +45 port or −45 port) between column subarrays 17. For example, such dipole-based antennas shown in FIG. 1 meet the normal industry standards for XPI and CPI of 25 dB, and only after adding Printed Circuit Board (PCB) fences.

However, due to nature of dipole elements 14, the azimuth beamwidth of each single column subarray 17 is relatively wide thus reducing gain of the single column. Also, for such a single-type element antenna 10 with dipole antenna elements 14, the cross-polar discrimination (XPD) of a single column subarray 17 is below the required industry standard specifications, even using some tuning parts 16.

On the other hand, in another prior art arrangement, an eight-port, four-column, twelve-row patch-based beam forming antenna (See prior art FIG. 2), has closely spaced forty-eight patch elements 24 installed uniformly on reflector 22 of antenna 20. Similarly, due to the dual polarized application, there are two ports 28 at the bottom of the antenna for each column subarray 27, thus eight ports 28 for antenna 20. Subarray 27 refers to all patch elements within a single column.

Theoretically, for patch-based antennas, the Cross Polar Discrimination (XPD) and the azimuth beamwidth variation of the single column subarray 27 meet required industry specifications (±15 deg). However, due to the strong coupling between each patch-based subarray column 27, both Cross Polar Isolation (XPI) within columns and Co Polar Isolation (CPI) between columns of antenna 20 are below the required industry standard specification for CPI and XPD of 25 dB, even using some tuning parts 26. Furthermore, the degraded CPI due to closely spaced patch-based column subarrays 27 will widen the azimuth beam width of two center subarray columns 27 significantly, and the large azimuth beam width differences between two edge columns and two center columns make it very difficult to meet the azimuth beamwidth variation specification requirements of the antenna.

As explained previously, patch and dipole elements are two basic radiating components for use in base station antennas including beam forming antennas. Such antennas do function in the industry but do not have ideally electrical signal quality.

Due to the strong coupling between column subarrays 17/27 in prior art FIGS. 1 and 2 with narrow azimuth spacing, it is challenging to simultaneously meet the required specification of each of the cross polar isolation (XPI) within columns, the co-polar isolation between columns (CPI), the cross polar discrimination (XPD), and the azimuth beam width variation of the column pattern for the antenna based on a single type of antenna elements.

Objects and Summary:

The present arrangement looks to overcome the drawbacks associated with the prior art and provide a combination patch/dipole hybrid subarray instead of a single-type element array (either dipole or patch alone) to improve the XPI, CPI, XPD, and the azimuth beam width variation of the beamforming antennas.

To this end a beamforming cellular antenna includes a plurality of patch elements and a plurality of dipole elements. The plurality of patch elements and dipole elements are arranged on a planar array of said antenna into a plurality of rows and columns of elements. Each column of elements forms a sub-array connected to a plurality of signal input ports. Each column sub-array includes a plurality of both patch elements, and a plurality of dipole elements.

BRIEF DESCRIPTION OF THE DRAWINGS

The present invention can be best understood through the following description and accompanying drawing, wherein.

DETAILED DESCRIPTION

The present arrangement as described in more detail below provides a new approach applied to the beamforming antennas using a mix of element types. This combination of elements improves the cross polar isolation (XPI) within columns, the co-polar isolation (CPI) between columns, and the cross polar discrimination (XPD), and reduces the azimuth beam width variation of the column pattern of the antenna. In accordance with the embodiments presented herein, using a mixed patch-dipole approach for a beam forming antenna, all above-mentioned parameters are able to meet the required industry standard specifications for beamforming antennas, such as 25 dB for XPI and CPI, and 20 dB for XPD.

Figure 3A:
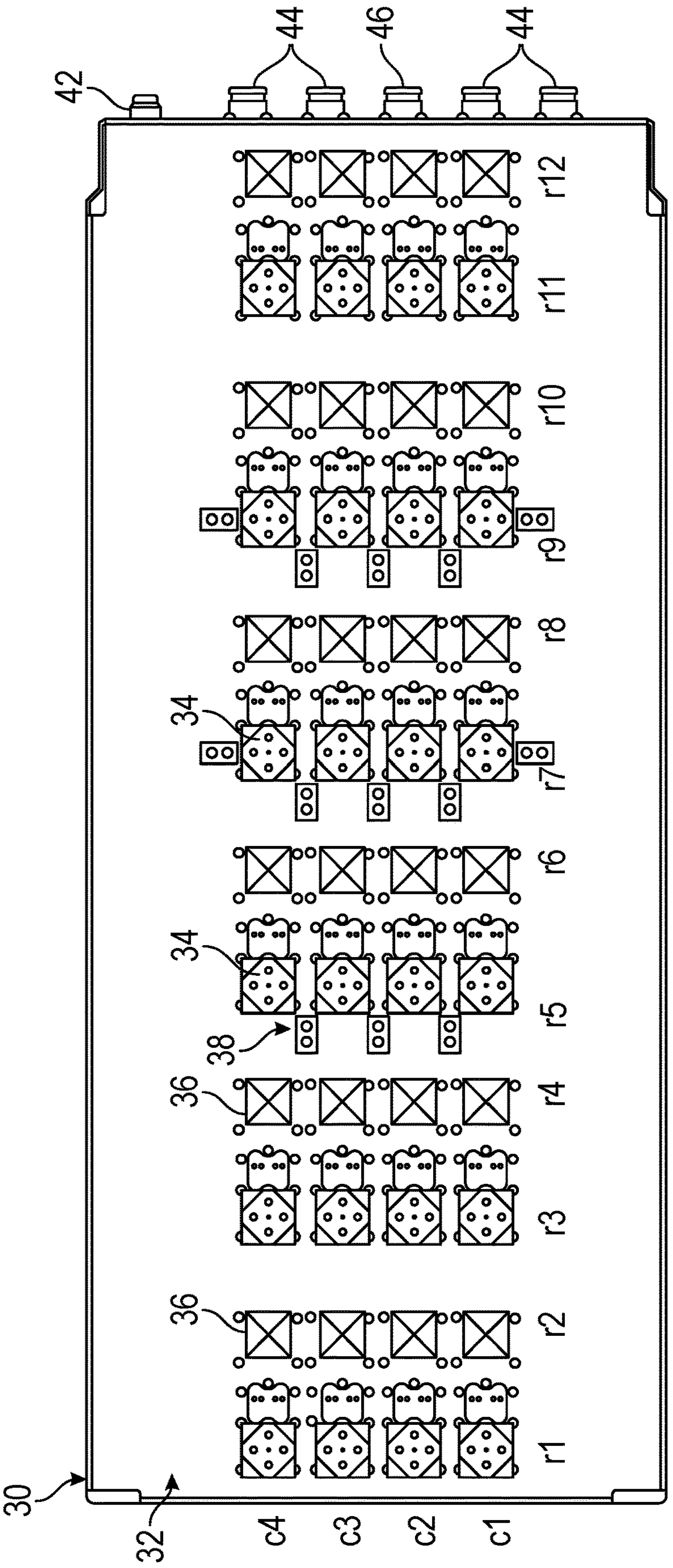
FIG. 3A is a front view of a beam forming antenna in accordance with one embodiment.

In accordance with one embodiment, FIGS. 3A-3E show a beam forming antenna 30 for the single band 5G application (i.e., 3.3-4.2 GHz). FIG. 3A is a front view of an eight port, four column (C1-C4), twelve-row (R1-R12) beam forming antenna 30 with a mix of patch elements 34 and dipole elements 36. The closely spaced forty-eight total elements (i.e., twenty-four patch elements 34 and twenty-four dipole elements 36 are installed uniformly and alternatively on reflector 32 of antenna 30. In each column subarray (C1-C4), which is a linear array, there are twelve antenna elements; six are wideband stacked patch antenna elements 34, and other alternative six are wideband cross dipole antenna elements 36.

In one arrangement, antenna 30 utilizes a dual polarized application, so there are two ports 40 for each column subarray, which amounts to eight ports 40 for antenna 30. (See FIG. 3B and the description below for additional details on ports 40).

Figure 1:
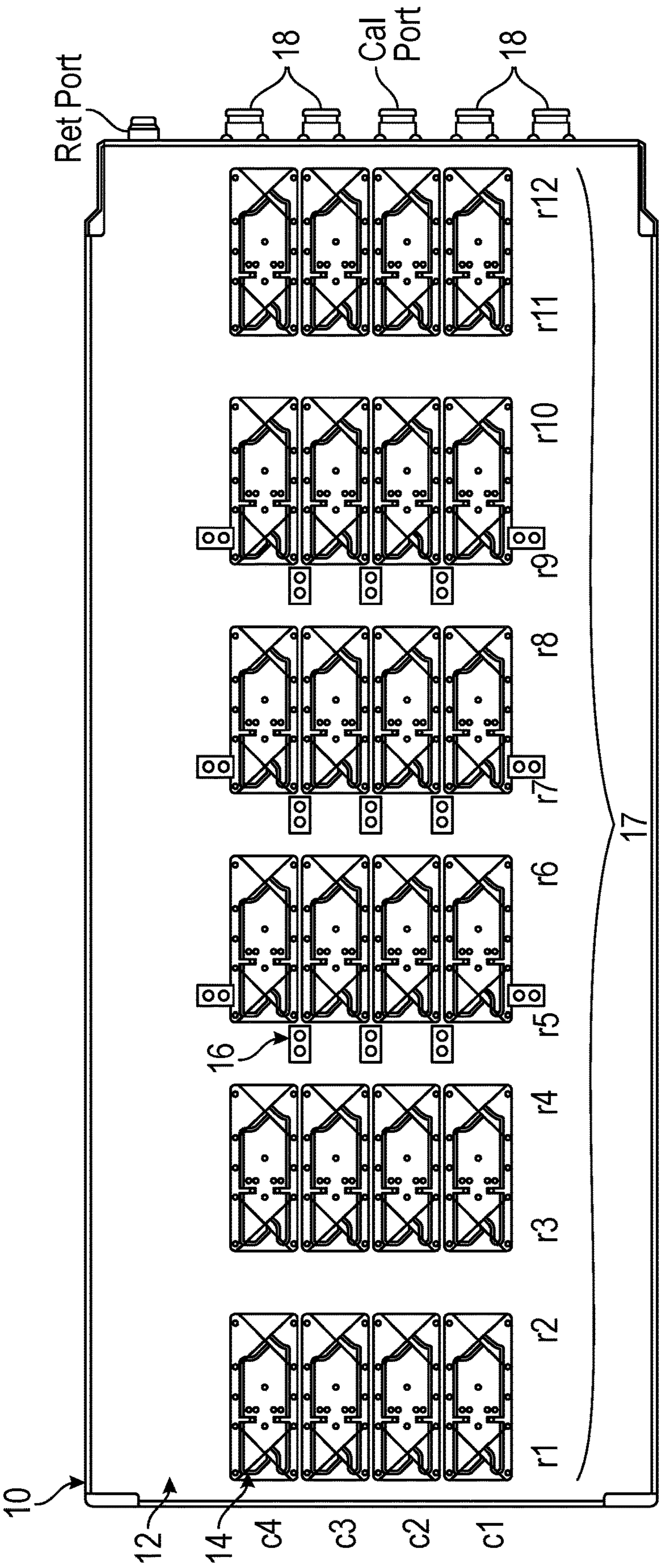
FIG. 1 (Prior Art)
FIG. 1 is a prior art, front view of an eight port, four column, twelve row dipole-based beam forming antenna.
Figure 2:
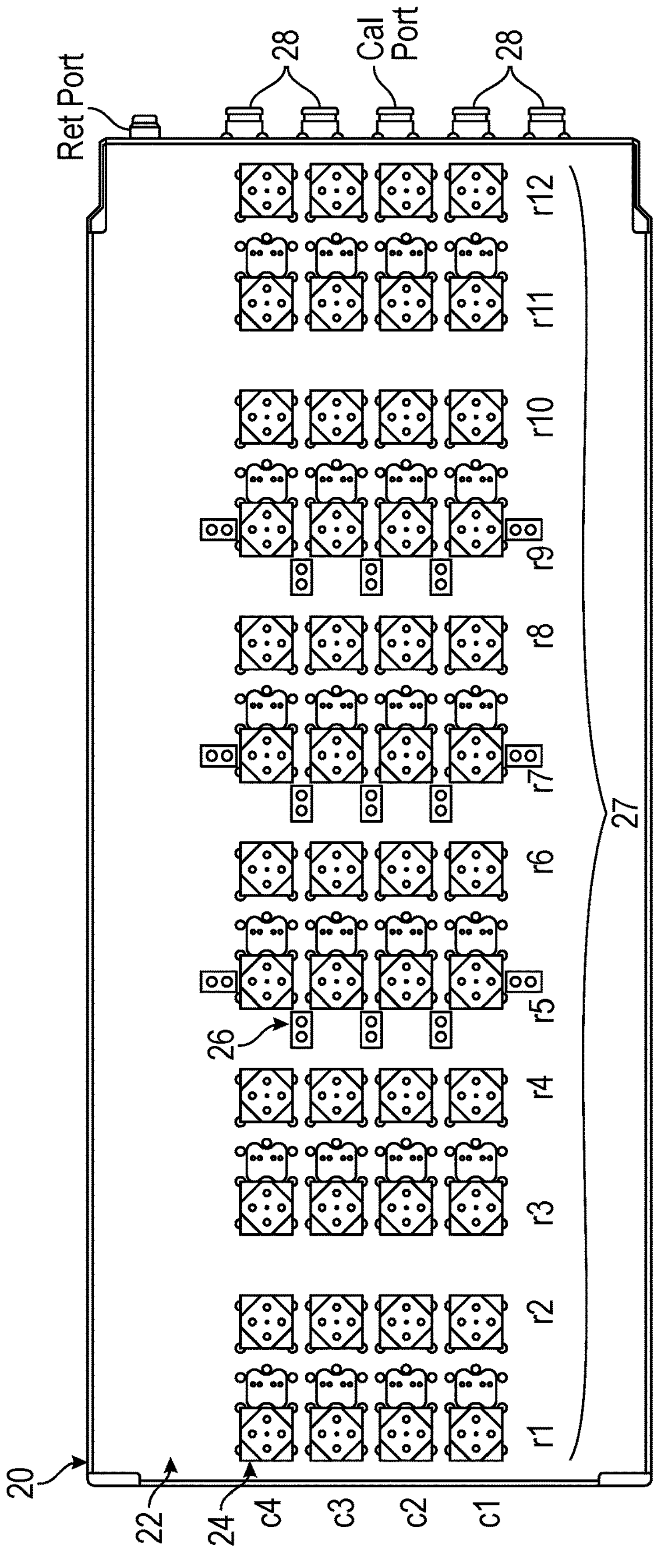
FIG. 2 (Prior Art)
FIG. 2 is a prior art, front view of an eight port, four column, twelve row patch-based beam forming antenna.

At row numbers R5, R7 and R9 from top of antenna 30, as shown in FIG. 3A, a few tuning parts or fences 38 are located around patch antenna elements 34 symmetrically to improve the isolations such as XPI of the beam forming antenna 30. Like the prior art as shown in FIG. 1 and FIG. 2, certain amounts of the tuning parts 38 are applied to compensate the field distribution unbalances between two polarizations (i.e., XPI of the column subarray) caused by the mutual coupling due to the nearby column subarrays.

Figure 3B:
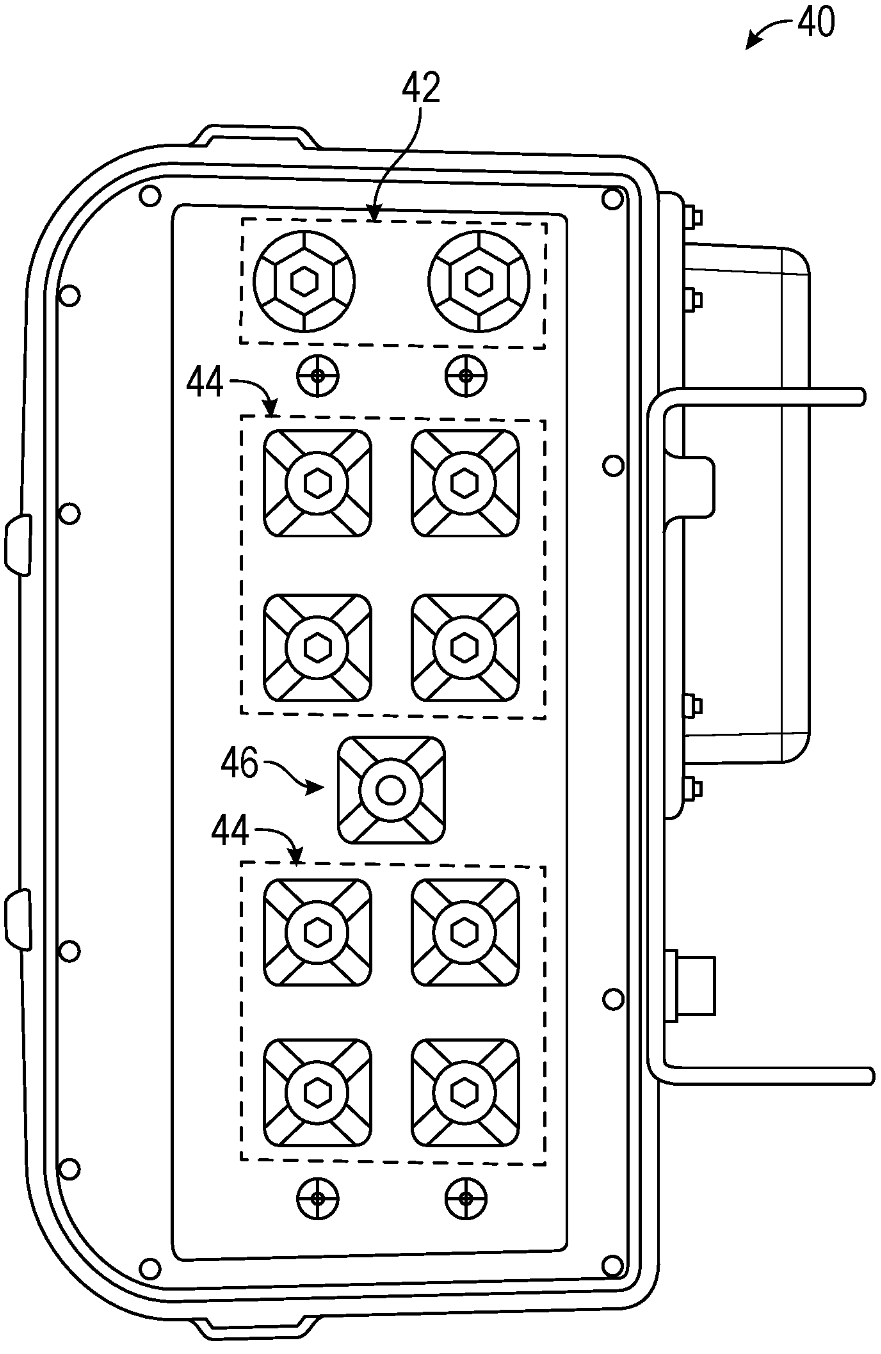
FIG. 3B is a bottom view of the beam forming antenna of FIG. 3A in accordance with one embodiment.

FIG. 3B is a bottom view of beam forming antenna 30 with three kinds of ports 40, in which there are two AISG (Antenna Interface Standard Group, one male and one female) ports 42 for controlling the elevation beam peaks remotely, eight signal ports 44, and one calibration CAL port 46.

Figure 3C:
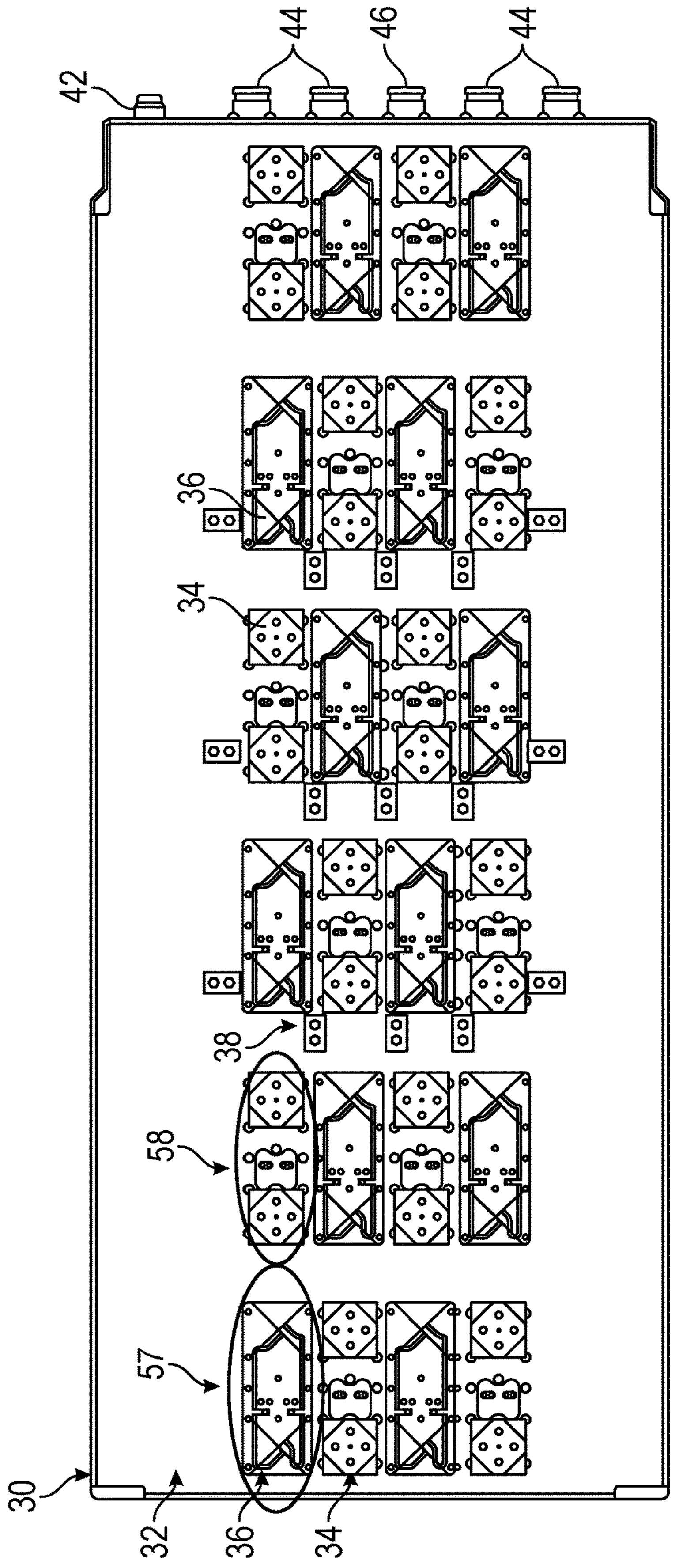
FIG. 3C is a front view of a beam forming antenna with alternative mixed patch-dipole element arrangement.

Based on the specific performance of patch elements 34 and dipole elements 36, the current embodiment can cover any combination of patch elements 34 and dipole elements 36 if the same azimuth spacing between four column subarrays is maintained. For example, FIG. 3C shows an alternative embodiment with a mixed patch-dipole arrangement in which a 2up dipole subarray 57 and a 2up patch subarray 58 are installed on reflector 32 of antenna 30. A "2-up subarray" refers to a group of two individual elements 34/36 mounted on a single printed circuit board (PCB) with a combined feeding network. Because two neighboring elements in such 2up subarrays 57/58 are located physically in different locations along the azimuth direction (i.e. vertically), the mutual coupling between full column subarrays (i.e. all elements in a vertical column) are reduced significantly.

Figure 3D:
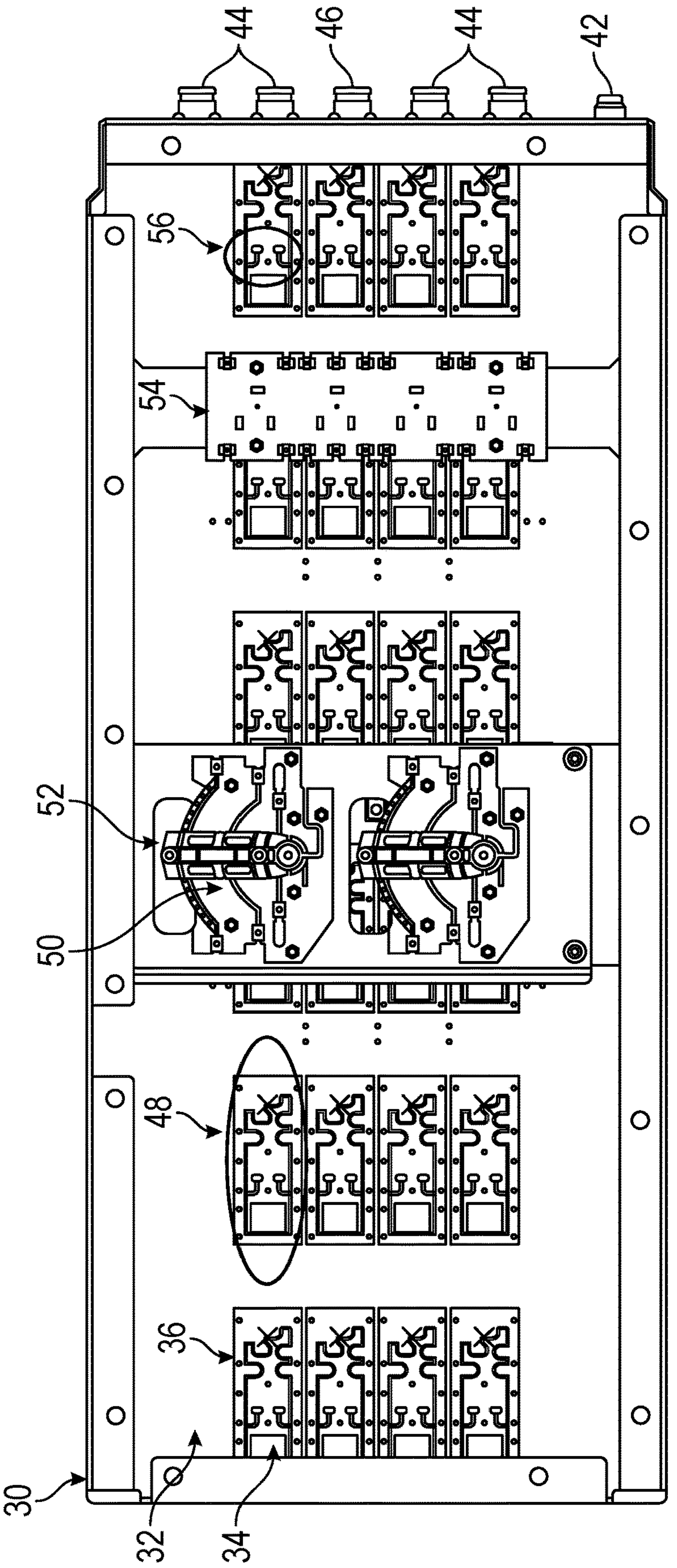
FIG. 3D is a back view of the beam forming antenna of FIG. 3A in accordance with one embodiment.

Returning to the embodiment of FIG. 3A, FIG. 3D is a back view of beam forming antenna 30 of FIG. 3A with mixed patch and dipole elements 34 and 36. There are eight phase shifters 50 and one calibration board 54 (the image has two phase shifters 50 visible but they are in two stacks of four). Phase shifters 50 are connected to ports 40 though the calibration board 54 so that majority of input signals are transferred from ports 40 to the phase shifters 50 (i.e., >95%) and only small of input signals are transferred from signal ports 40 to the calibration port 40 (i.e., −26±2 dB from signal ports 44 to the calibration port 46 as shown in FIG. 3B) and calibration board 54 is inserted between phase shifters 50 and ports 40 to provide a calibration signal that can calibrate the amplitude and phase errors caused by other devices in radio frequency (RF) path.

Each pair of patch element 34 and dipole element 36 are linked by T-splitter type BFN 56 to form each 2up subarray 48 (one set of combined elements 34/36). As shown in FIG. 3D, there are twenty-four basic block 2up subarrays 48 (in other words each two elements 34/36 in one column and from two consecutive rows are on a common PCB linked by two T-splitters 56 and together are called a 2up subarray 48).

Phase shifter 50 shown in FIG. 3D is a rotary phase shifter in which the required phase shift for the peak movement of the elevation beam is realized through rotating wiper 52 in some instances driven remotely through RET (Remote Electrical Tilt). Both an RET system and the cable connections between RET and AISG ports 42 are shown in FIG. 3D. In each column subarray, two rotary phase shifters 50 with one input and six outputs are used to realize the dual polarized elevation beam peak control, in which one input of phase shifter 50 is connected to port 40 of antenna 30 though the calibration board 54 and six outputs of phase shifter 50 are connected to six "2up" subarrays 48 within one column subarray.

For simplicity, cable connections between 2up subarrays 48 and phase shifters 50, cable connections between phase shifters 50 and calibration board 54, and cable connections between calibration board 54 and ports 40 of antenna 30 are not shown in FIG. 3D. In order to have an optimum cable length between 2up subarrays 48 and phase shifter(s) 50, eight phase shifters 50 are located at the middle of antenna 30 in a side-by-side arrangement of four stacked upon each other as noted above. In other words, four phase shifters 50 are stacked and the other stacked four phase shifters 50 are located beside the first stack.

As noted above, since there are two polarizations in each column subarray, for four column array antenna 30, there are a total of eight linear array beams with eight antenna ports 40 (i.e., signal ports 44). For each column subarray, like traditional base station linear array antennas, six 2up patch-dipole subassemblies (i.e. 2up) 48 in one column are linked with two phase shifters 50: one for +45 polarization and one for −45 polarization. The elevation peaks of two polarization beams within each column subarray are controlled by the corresponding phase shifters 50. In some examples, through a remote-control electrical tilt unit (e.g. RET, not shown), the elevation peak range can be controlled between 2° to 12° below horizon.

As mentioned above, for each phase shifter 50, there is one input to calibration board 54 and six outputs to the six 2up patch-dipole subassemblies 48 (i.e., rows R1-R2, rows R3-R4, rows R5-R6, rows R7-R8, rows R9-R10, and rows R11-R12 from top of the antenna) of the corresponding column subarrays. In accordance with one embodiment, between phase shifters 50 and antenna ports 40, located at the bottom of antenna 10, there is one calibration board 54.

Figure 3E:
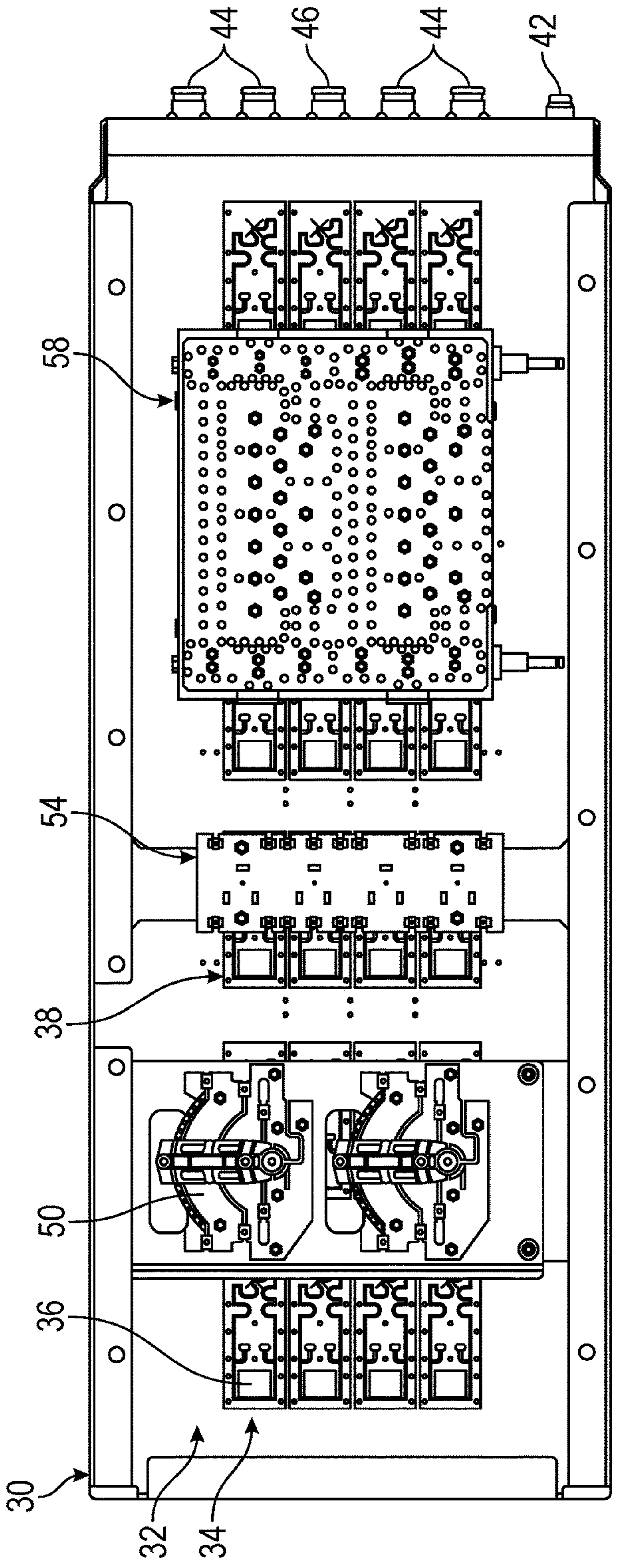
FIG. 3E is an alternative back view of the beam forming antenna of FIG. 3A in accordance with one embodiment.
Figure 4:
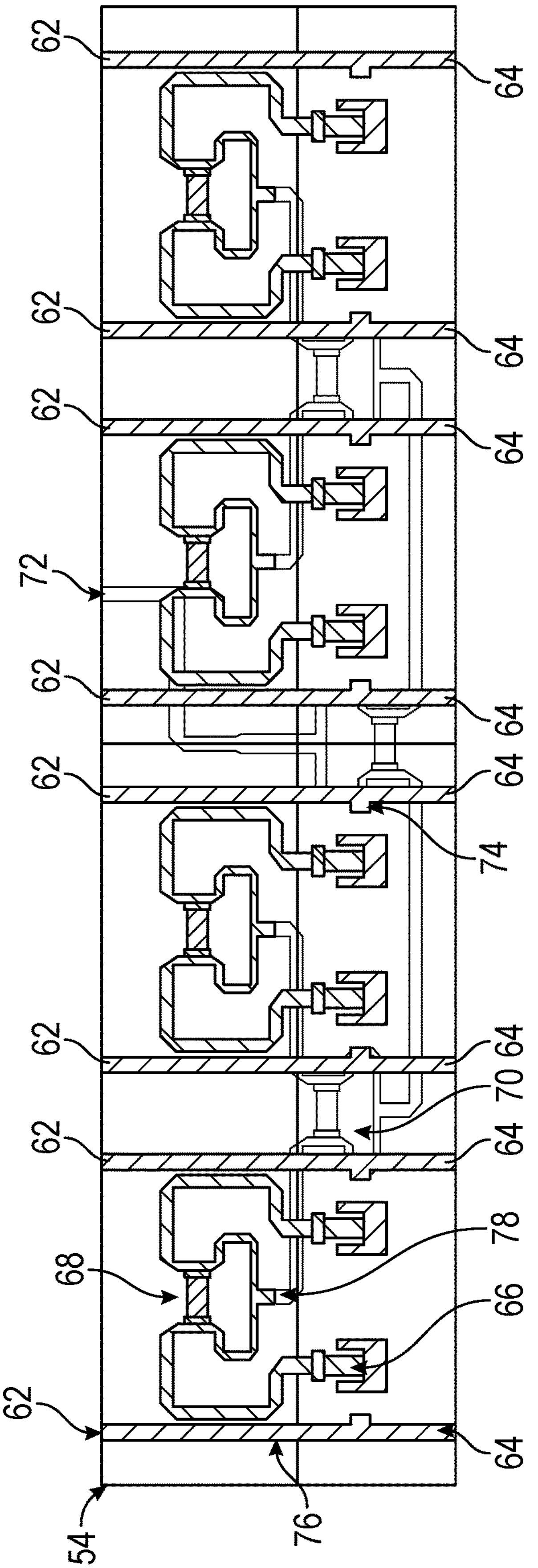
FIG. 4 is microstrip layout of the multilayer calibration board used in the beam forming antenna of FIG. 3A and FIG. 3C in accordance with one embodiment.

FIG. 4 shows an exemplary multilayer microstrip layout of calibration board 54 (i.e. from FIGS. 3D and 3E) in which eight inputs 62 are connected to antenna ports 40, eight outputs 64 are connected to eight phase shifters 50, and one calibration port 72 is connected to calibration port 46 of antenna 30. As illustrated in the arrangement of FIG. 4, a small portion of energy (around 16.5 dB) is coupled to a 50-ohm microstrip line through microstrip directional coupler 76 loaded with 50-ohm resistors 66 and located between inputs 62 and outputs 64 of calibration board 54. Two coupled signals are combined by a Wilkinson Power Divider (WPD) loaded with a 100-ohm resistor 68. Both directional coupler 76 and Wilkinson power combiner 68 are located at first layer of calibration board 60. Through four via holes 78, four group signals are combined into calibration port 72 through three WPD combiners loaded with 100-ohm resistors 70 at third layer of calibration board 54. Due to the symmetrical structure of calibration board 54, the coupling from calibration port 72 to any of eight inputs 62 is maintained at same level.

Calibration board 54 calibrates the amplitude and phase error of the whole radio frequency system including cable connections outside of antenna 30. The coupling spec of antenna 30 which includes the cable connection between antenna ports 44 and input port 62 of calibration board 54, the signal coupling output from input 62 to calibration port 72 of the calibration board 54, and the cable connection between antenna calibration port 46 (e.g. of FIG. 3B) and calibration port 72 of calibration board 54, is −26±2 dB, and the amplitude/phase error requirements between antenna ports 44 of antenna 30 across the whole required frequency band is less than ±0.7 dB/±7 degree.

FIG. 3E is a back view of alternative beam forming antenna 30 with mixed patch and dipole elements 34 and 36, in which there are eight phase shifters 50, one calibration board 54, and eight band pass filters 58. Traditionally, in order to allow signals within a particular frequency range to pass, high-performance band-pass filters 58 are installed outside of antenna 30. Here eight integrated switchable band selective filters 58 with bypass option are integrated within antenna 30.

The integrated version as shown in FIG. 3E has some advantages including but not limited to lower loss and less outdoor cables in comparison with standalone antenna and separate filter components. It is worth to note that, in order to make space for filters 58, the eight phase shifters 50 are moved upward and the cable length between 2up subassemblies 48 and phase shifter 50 is not optimised fully.

Figure 5A:
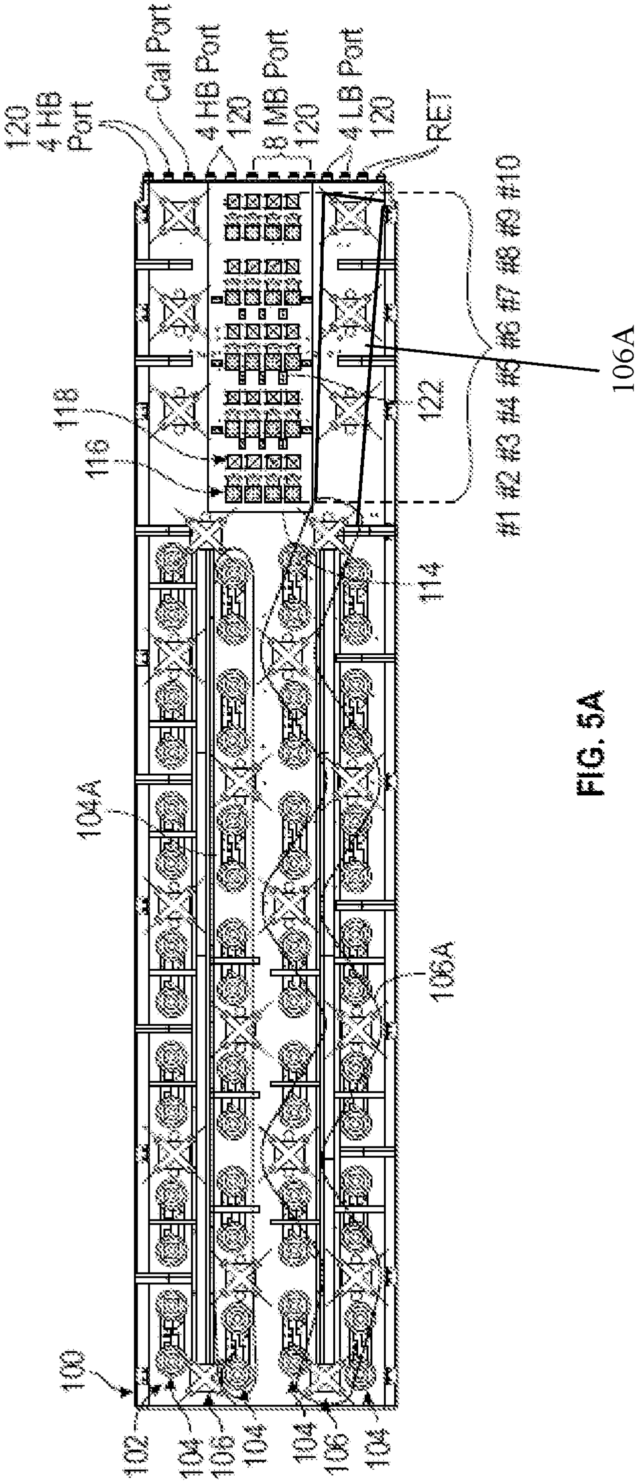
FIG. 5A is a front view of a beam forming antenna in accordance with another embodiment.
Figure 5B:
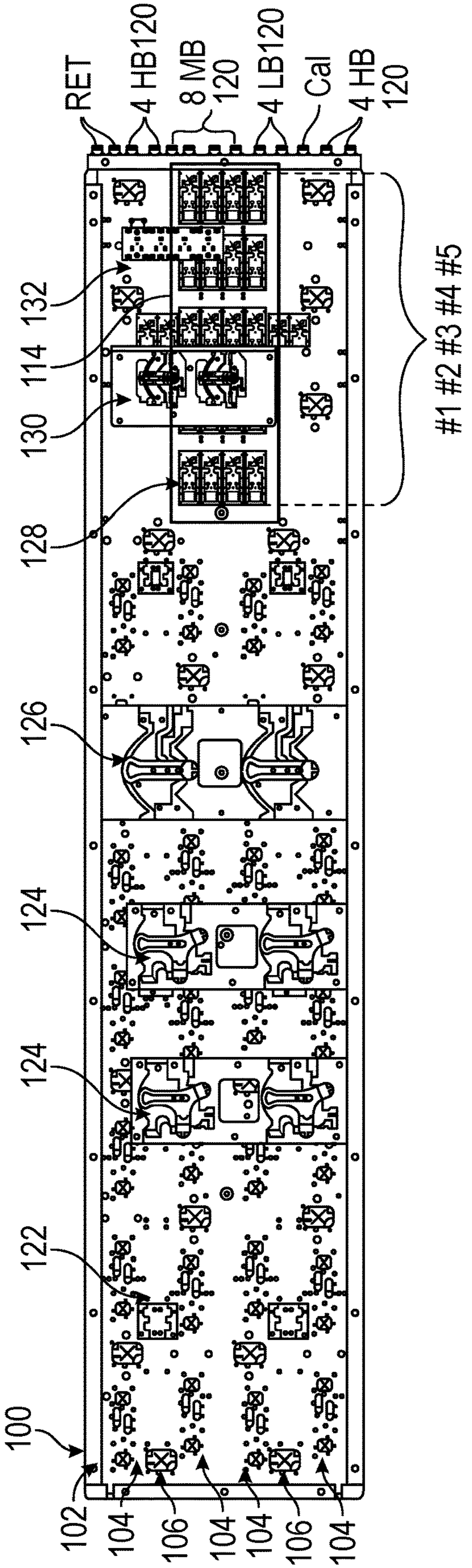
FIG. 5B is a back view of the beam forming antenna of FIG. 5A in accordance with another embodiment.

In another embodiment, illustrated in FIGS. 5A and 5B, a hybrid beam forming antenna 100 for tri-band application (0.698-0.96 GHz, 1.695-2.69 GHz, and 3.3-4.2 GHz) is shown (e.g. Low band (LB): GHz; Middle band (MB): 1.695-2.69 GHz; High band (HB): 3.3-4.2 GHz). There are twenty ports 120 at the bottom of antenna 100: four ports at LB, eight ports at MB, and eight ports at HB.

The antenna arrays working at LB and MB are traditional 65 deg array, and the antenna array at HB is the beam forming array. For example, FIG. 5A shows the top view of tri-band antenna 100 that has four port LB array made of dipole elements 106, eight port MB array made of dipole elements 104, and a four-column array 114 at HB of beam forming elements including patch elements 116 and dipole elements 118 (e.g. similar to the arrangement of FIG. 3A above). Note all dipole elements 106 together form the LB array and all dipole elements 104 form the MB array.

In this arrangement, there are two traditional 65 deg beam arrays 106A for four ports 120 operating at LB, and four traditional 65 deg beam arrays 104A for eight ports 120 operating at MB, and one beam forming antenna 114 with four columns and ten rows (numbered rows #1-#10) located at the right side of FIG. 5A. Beam forming antenna 114 is inserted in a traditional 65 deg dual band twelve port arrays. In other words, the antenna size of twenty port hybrid beamforming antenna 100 is same as a prior art twelve port 65 deg antenna working only at LB and MB.

FIG. 5B shows the back view of tri-band antenna 100 that has two column LB arrays 106 with four LB phase shifters 126 (stacked), four column MB arrays 104 with eight MB phase shifters 124 (two stacked columns of 4), and four column beam forming array 114 at HB with twenty HB mixed patch-dipole 2ups 128 (i.e., the back side of combined unites of 116/118), eight HB phase shifters 130 (stacked), and one calibration board 132.

As noted above, in the LB array of antenna 100, there are two column subarrays 106*a* in which each column array consists of eleven LB dipole elements 106 connected to two LB phase shifters 126 with help of power splitter 122 to realize elevation beam peak control. In one example, through a remote-control electrical tilt unit (RET, not shown), the elevation peak range at LB can be controlled between 2° to 16° below horizon.

In the MB array of antenna 100, there are four column subarrays 104A of dipole elements 104 in which each column array has fourteen MB dipole elements 104 (or seven 2ups-i.e. pairs of dipole elements 104) per column, connected to two MB phase shifters 124 on the back of antenna 100 to realize the elevation beam peak control. Through a remote-control electrical tilt unit (RET, not shown), the elevation peak range at MB can be controlled between 0° to 8° below horizon.

In each column of beamforming array 114, there are ten antenna elements: five are wideband stacked patch antenna elements 116, and the other five are wideband cross dipole antenna elements 118. At row number #3, #5 and #7, as shown in FIG. 5A, a few tuning parts (or fences) 122 are located around patch antenna elements 116, symmetrically, to adjust the performance of the beam forming antenna.

As with the antennas from FIGS. 3A-3E, since there are two polarizations in each column (or linear array), as shown in FIG. 5B, there are a total of eight HB ports feeding eight linear array beams in which its corresponding 2up patch-dipole subassembly 128 (i.e. connected pair of a patch 116 and dipole 118) within each column are linked with two phase shifters 130, so that their elevation beam peaks are controlled by the corresponding phase shifter 130 individually. Through the remote-control electrical tilt unit (RET, not shown), an elevation peak range can be controlled between 2° to 12° degrees below horizon at HB. For each phase shifter 130 of a high band beam forming array, there are one input to calibration board 132 and five outputs to five 2up patch-dipole subassemblies 128. Between phase shifters 130 and antenna ports 120 located at the bottom of antenna 100, there is one calibration board 132 with eight (8) inputs to the antenna ports 120, eight (8) outputs to eight (8) phase shifters 130, and one calibration port to calibration port 120 of the antenna as shown in FIG. 5A. The purpose of calibration board 142 is to calibrate the amplitude and phase error of the whole system including cable connections outside of antenna 100.

In this embodiment, except eight phase shifters 130 and one calibration board 132 for the beam forming at HB, there are additional four phase shifters 126 for the low band (0.698-0.96 GHz) and eight phase shifters 124 for the middle band (1.695-2.69 GHz). For simplicity, the cable connections between low band dipole subassemblies 106 and LB phase shifters 126, the cable connections between middle band dipole subassemblies 104*a* and MB phase shifters 124, the cable connections between 2up patch-dipole subassemblies 128 and phase shifters 130, and cable connections between phase shifters 130 and calibration board 132 are not shown in FIG. 5B.

In order to have an optimum cable length between low band, middle band, and high band element subassemblies and their corresponding phase shifters 124, 126, 130, four low band phase shifters 126, eight middle band phase shifters 124, and eight high band phase shifters 130 are located in the middle of the corresponding arrays of antenna 100, respectively.

Like single band beam forming antenna 30 as shown in FIG. 3D, four of high band phase shifters 130 are stacked and another stack of four phase shifters 130 are located beside the first one. For LB/MB array, only two of LB phase shifters 126 and MB phase shifters are stacked.

Applicants note that with both embodiments of FIGS. 3A-3E and 5A-5B, basic structure can be extended to any number of columns and any number of rows. For example, the twelve-row beamforming antenna shown in FIGS. 3A-3E can be extended to fourteen rows (or shortened to ten or six rows) depending on the gain requirement. In another example, by removing two MB columns 104A on the hybrid beamforming antenna shown in FIGS. 5A and 5B, a twelve row HB array can be inserted easily to form a sixteen port (i.e., 4 LB, 4 MB, and 8 HB) hybrid beamforming antenna. Also, the proposed beam forming antenna 30/114 can be inserted in any single band, dual band, and tri-band traditional 65 degree antenna array and multibeam antenna array as a component thereof.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

The invention claimed is:

1. A single band dual polarized beamforming cellular antenna comprising:

a plurality of dual polarized patch elements working in the single band;

a plurality of dual polarized dipole elements working at the same single band as said plurality of patch elements;

wherein said plurality of patch elements and dipole elements are arranged as a patch dipole sub-array on a planar array of said antenna into a plurality of rows and columns of elements, wherein each column of elements forms said sub-array connected to a plurality of signal input ports, and wherein each column sub-array includes a plurality of both patch elements, and a plurality of dipole elements.

2. The single band dual polarized beamforming cellular antenna as claimed in claim 1, wherein said column sub-array connected to said plurality of signal input ports includes a plurality of both patch elements and a plurality of dipole elements, alternating per element along the length of said column sub-array.

3. The single band dual polarized beamforming cellular antenna as claimed in claim 1, wherein said column sub-array connected to said plurality of signal input ports includes a plurality of both patch elements and a plurality of dipole elements, alternating in pairs of two elements along the length of said column sub-array.

4. The single band dual polarized beamforming cellular antenna as claimed in claim 1, wherein said antenna maintains an azimuth beamwidth variation tolerance of ±15deg.

5. The single band dual polarized beamforming cellular antenna as claimed in claim 4, wherein said antenna maintains Cross Polar Isolation (XPI) within said plurality of columns and Co Polar Isolation (CPI) between said plurality of columns are better than 25 dB.

6. The single band dual polarized beamforming cellular antenna as claimed in claim 1, wherein said single band is a 5G application of 3.3-4.2 GHz.

7. The single band dual polarized beam forming cellular antenna as claimed in claim 6, wherein said beamforming cellular antenna for said single band 5G application of 3.3-4.2 GHz is integrated into a larger multiport antenna reflector also having any one of medium band and low band antenna element arrays.

8. The single band dual polarized beamforming cellular antenna as claimed in claim 1, wherein at least some of said plurality of rows of elements further comprise tuning parts or fences.

9. The single band dual polarized beamforming cellular antenna as claimed in claim 1, wherein said antenna further comprises at least one calibration board coupled to a calibration port for receiving a calibration signal that calibrates an amplitude and/or phase error caused by other devices in a radio frequency (RF) path.

10. The single band dual polarized beamforming cellular antenna as claimed in claim 1, wherein, among said plurality of patch elements and said plurality of dipole elements, arranged into a plurality of columns of elements, two of said elements located adjacent to one another are connected in a sub-array.

11. The single band dual polarized beamforming cellular antenna as claimed in claim 10, wherein said connected adjacent elements in said subarray, are either one of two dipole elements, or two patch elements.

12. The single band dual polarized beamforming cellular antenna as claimed in claim 10, wherein said connected adjacent elements in said subarray, are one dipole element and one patch element.

13. The single band dual polarized beam forming cellular antenna as claimed in claim 1, wherein said at least two different dual polarized patch and dipole elements have a same electric filed (E-field) orientation and/or an anti-phase (E-field) orientation.

* * * * *